United States Patent [19]

Brubaker

[11] Patent Number: 5,735,367
[45] Date of Patent: Apr. 7, 1998

[54] HAND OPERATED SHOPPING CART BRAKE

[76] Inventor: Wilmer R. Brubaker, 110 Panorama Dr., Bishop, Calif. 93514

[21] Appl. No.: 751,652

[22] Filed: Nov. 18, 1996

[51] Int. Cl.[6] ........................... B60B 33/00; B62B 5/04
[52] U.S. Cl. .................................. 188/19; 188/1.12
[58] Field of Search ........................ 188/1–12, 19, 188/21, 22, 29, 31, 2 R; 267/71; 280/33.99 A

[56] References Cited

U.S. PATENT DOCUMENTS

| | | | |
|---|---|---|---|
| 4,545,322 | 10/1985 | Yang | 267/71 |
| 4,657,230 | 4/1987 | Weseloh | 267/71 |
| 5,325,938 | 7/1994 | King | 188/19 |
| 5,499,697 | 3/1996 | Trimble | 188/19 |

*Primary Examiner*—Robert J. Oberleitner
*Assistant Examiner*—C. T. Bartz

[57] ABSTRACT

A hand operated shopping cart brake including a brake mechanism with a first unbiased orientation for precluding movement of a cart and a second biased orientation for allowing movement of the cart. Further provided is a hand actuated brake disengagement assembly with a first unbiased orientation for maintaining the brake mechanism in the first orientation thereof. Further, the brake disengagement assembly has a user actuated second biased orientation for maintaining the brake mechanism in the second orientation thereof.

1 Claim, 3 Drawing Sheets

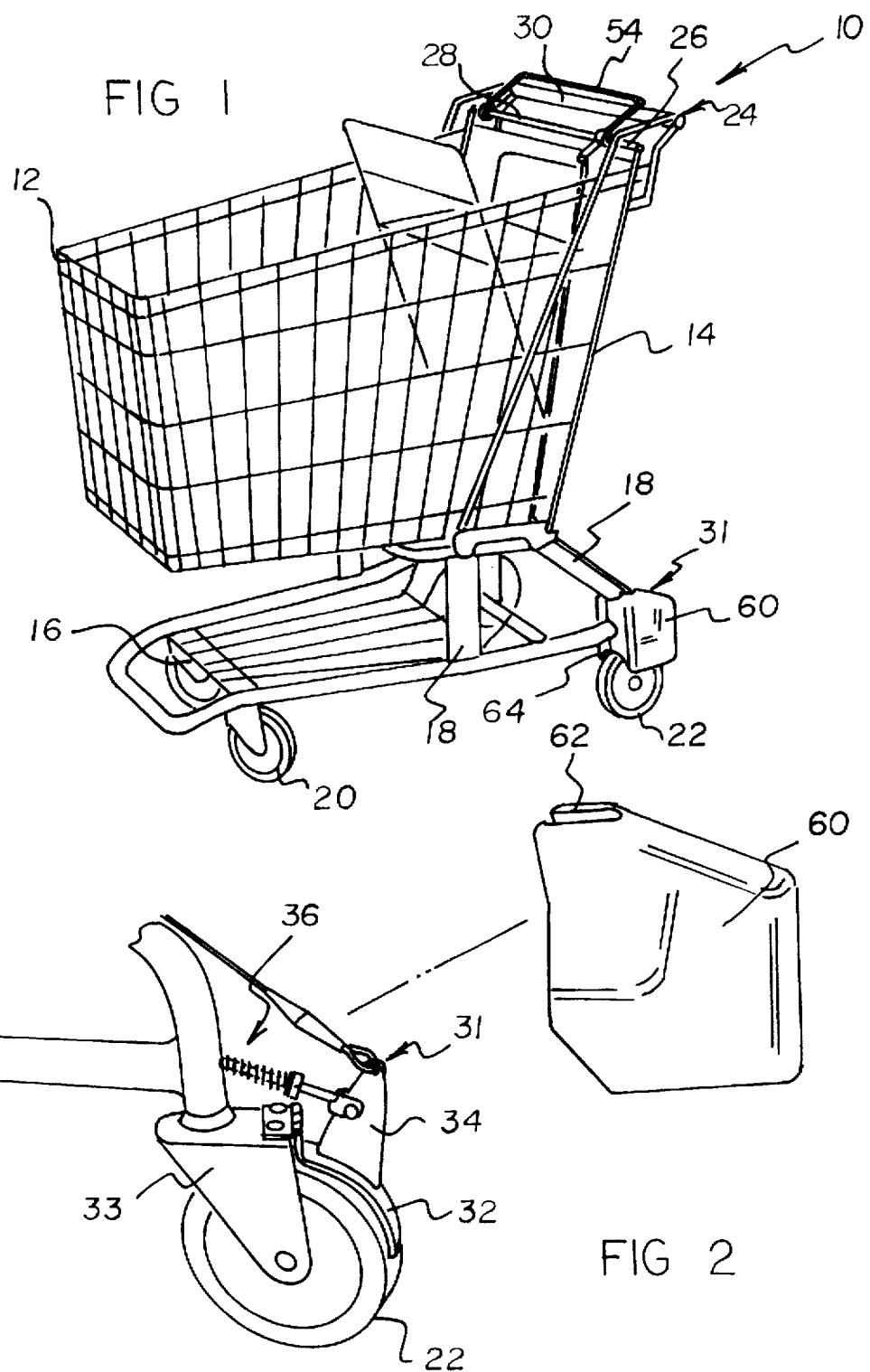

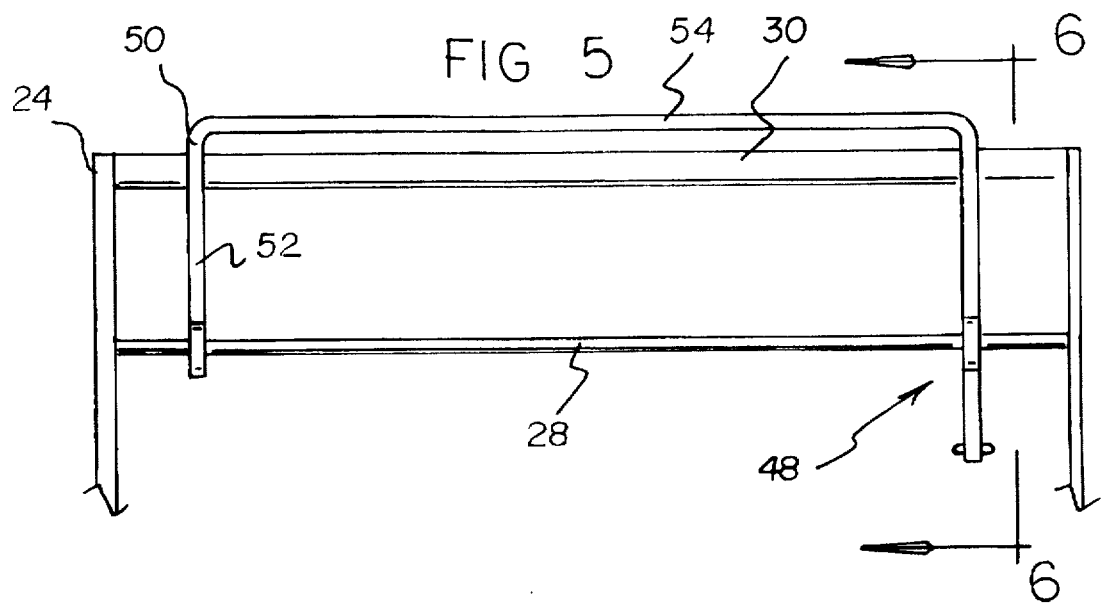
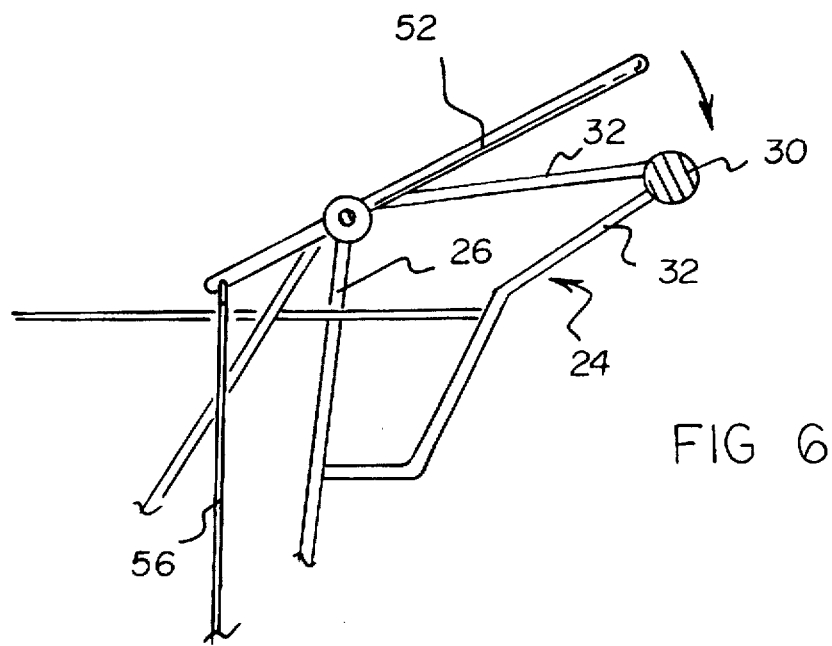

HAND OPERATED SHOPPING CART BRAKE

BACKGROUND OF THE INVENTION

1. Field of the Invention

The present invention relates to a hand operated shopping cart brake and more particularly pertains to providing a brake which precludes the movement of a shopping cart unless an associated hand lever is biased.

2. Description of the Prior Art

The use of shopping cart brakes is known in the prior art. More specifically, shopping cart brakes heretofore devised and utilized for the purpose of precluding the movement of an associated shopping cart are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,390,942 to Schuster et al.; U.S. Pat. No. 5,199,534 to Goff; U.S. Pat. Des. 362,529 to Hilaire, Jr. et al.; U.S. Pat. No. 5,383,536 to Butter et al.; U.S. Pat. No. 5,236,066 to O'Neal et al.; and U.S. Pat. No. 5,042,622 to Smith et al.

In this respect, the hand operated shopping cart brake according to the present invention substantially departs from the conventional concepts and designs of the prior art, and in so doing provides an apparatus primarily developed for the purpose of providing a brake which precludes the movement of a shopping cart unless an associated hand lever is biased.

Therefore, it can be appreciated that there exists a continuing need for a new and improved hand operated shopping cart brake which can be used for providing a brake which precludes the movement of a shopping cart unless an associated hand lever is biased. In this regard, the present invention substantially fulfills this need.

SUMMARY OF THE INVENTION

In view of the foregoing disadvantages inherent in the known types of shopping cart brakes now present in the prior art, the present invention provides an improved hand operated shopping cart brake. As such, the general purpose of the present invention, which will be described subsequently in greater detail, is to provide a new and improved hand operated shopping cart brake which has all the advantages of the prior art and none of the disadvantages.

To attain this, the present invention essentially comprises a shopping cart having an upper storage portion. Such upper portion includes a bottom face, a rear face, a front face, a top opening and a pair of side faces defining an interior space. With reference to FIG. 1, a lower storage portion is situated below the bottom face of the upper storage portion. A plurality of stanchions are coupled between a rear extent of the lower portion and the bottom face of the upper storage portion for maintaining the relative position thereof. For providing mobility of the cart, the lower storage portion further includes a pair of front swiveling wheels depending from two front corners thereof and a pair rear wheels depending from two rear corners thereof. It is imperative that the rear wheels are rotatable about a fixed axis. Also part of the cart is a handle portion with a pair of generally vertical bars extending upwardly from opposite side faces of the upper portion adjacent the rear face thereof. A horizontal bar is coupled between ends of the vertical bars. For allowing a user to push the cart, a horizontally oriented handle bar is coupled to ends of the vertical bars via connecting members as shown in FIG. 1. By this structure, the handle bar is situated in parallel with the horizontal bar and positioned upwardly and rearwardly therefrom. As shown in FIGS. 2–4, a brake mechanism is included with an arcuate shoe hingably coupled at an upper end thereof to the lower storage portion of the cart. A tab is integrally coupled to an outer surface of the shoe and extended upwardly therefrom. Associated therewith is an adjustable spring mechanism having a first arm rotatably coupled adjacent a top extent of the tab. The first arm has a flange formed on a central extent thereof. Also included is a second hollow arm rotatably coupled to the lower storage portion of the cart. The first arm is slidably situated within the second arm and a spring is operatively situated about the arms between the lower storage portion of the cart and the flange. As such, the shoe has a first unbiased orientation abutting an associated rear wheel for precluding the movement of the cart and a second biased orientation with the shoe positioned away from the wheel for allowing the movement of the cart. For controlling the brake mechanism, a brake disengagement assembly is included with a hand lever. The handle lever has a pair of lever rods rotatably coupled at a midpoint thereof to the horizontal bar of the handle portion of the cart adjacent the vertical bars. A horizontally orientated cross bar is integrally coupled between first ends of the lever rods. The brake disengagement assembly further includes a cable coupled at a first end thereof to a second end of one of the lever rods. The cable is further coupled at a second end thereof to a top extent of the tab of the brake mechanism. By this structure, the cross bar of the handle lever has a first orientation located at a distance above the horizontal bar of the handle portion of the cart when the shoe is in the first unbiased orientation thereof. Further, the brake shoe is forced to the biased orientation thereof upon a user positioning the handle lever in a second orientation thereof in abutment with the handle bar of the handle portion of the cart.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hand operated shopping cart brake which has all the advantages of the prior art shopping cart brakes and none of the disadvantages.

It is another object of the present invention to provide a new and improved hand operated shopping cart brake which may be easily and efficiently manufactured and marketed.

It is a further object of the present invention to provide a new and improved hand operated shopping cart brake which is of a durable and reliable construction.

An even further object of the present invention is to provide a new and improved hand operated shopping cart brake which is susceptible of a low cost of manufacture with regard to both materials and labor, and which accordingly is then susceptible of low prices of sale to the consuming public, thereby making such hand operated shopping cart brake economically available to the buying public.

Still yet another object of the present invention is to provide a new and improved hand operated shopping cart brake which provides in the apparatuses and methods of the prior art some of the advantages thereof, while simultaneously overcoming some of the disadvantages normally associated therewith.

Still another object of the present invention is to provide a brake which precludes the movement of a shopping cart unless an associated hand lever is biased.

Lastly, it is an object of the present invention to provide a new and improved hand operated shopping cart brake including a brake mechanism with a first unbiased orientation for precluding movement of a cart and a second biased orientation for allowing movement of the cart. Further provided is a hand actuated brake disengagement assembly with a first unbiased orientation for maintaining the brake mechanism in the first orientation thereof. Further, the brake disengagement assembly has a user actuated second biased orientation for maintaining the brake mechanism in the second orientation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the hand operated shopping cart brake constructed in accordance with the principles of the present invention.

FIG. 2 is a close-up perspective view of the brake mechanism and associated cover.

FIG. 5 is a front elevational view of the handle portion and brake disengagement assembly of the present invention.

FIG. 6 is a side view of the present invention as shown in FIG. 5.

Similar reference characters refer to similar parts throughout the several views of the drawings.

DESCRIPTION OF THE PREFERRED EMBODIMENT

Figure 3:
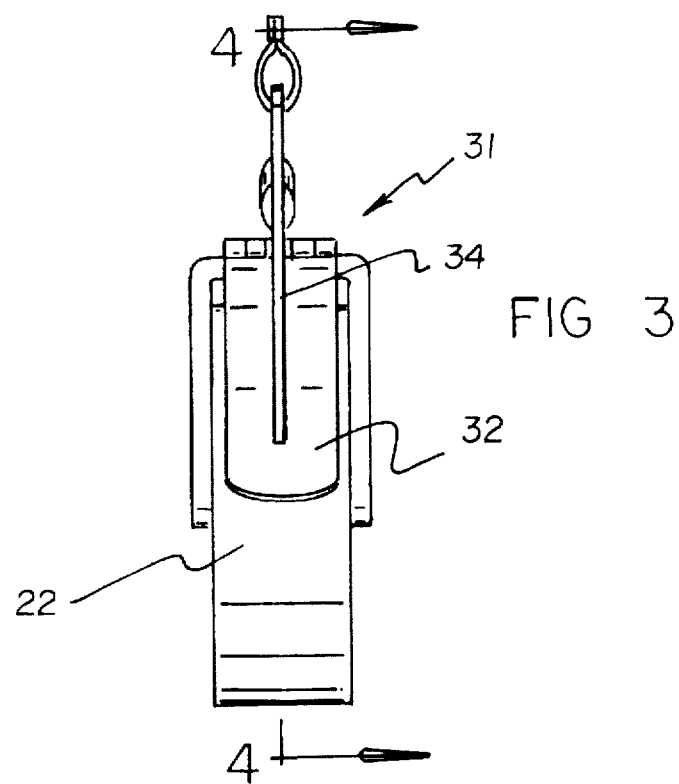
FIG. 3 is a rear elevational view of the shoe of the brake mechanism shown in FIG. 2.

With reference now to the drawings, and in particular to FIG. 1 thereof, a new and improved hand operated shopping cart brake embodying the principles and concepts of the present invention and generally designated by the reference numeral 10 will be described.

The present invention, the new and improved hand operated shopping cart brake, is comprised of a plurality of components. Such components in their broadest context include a shopping cart, a brake mechanism, and a brake disengagement assembly. Such components are individually configured and correlated with respect to each other so as to attain the desired objective.

More specifically, it will be noted that the system 10 of the present invention includes a shopping cart 12 having an upper storage portion 14. Such upper portion includes a bottom face, a rear face, a front face, a top opening and a pair of side faces defining an interior space. With reference to FIG. 1, a lower storage portion 16 is situated below the bottom face of the upper storage portion. A plurality of stanchions 18 are coupled between a rear extent of the lower portion and the bottom face of the upper storage portion for maintaining the relative position thereof. For providing mobility of the cart, the lower storage portion further includes a pair of front swiveling wheels 20 depending from two front corners thereof and a pair rear wheels 22 depending from two rear corners thereof. It is imperative that the rear wheels are rotatable about a fixed axis. Also part of the cart is a handle portion 24 with a pair of generally vertical bars 26 extending upwardly from opposite side faces of the upper storage portion adjacent the rear face thereof. A horizontal bar 28 is coupled between ends of the vertical bars. For allowing a user to push the cart, a horizontally oriented handle bar 30 is coupled to ends of the vertical bars via connecting members 32 as shown in FIG. 1. By this structure, the handle bas is situated in parallel with the horizontal bar 28 and positioned upwardly and rearwardly therefrom.

Figure 4:
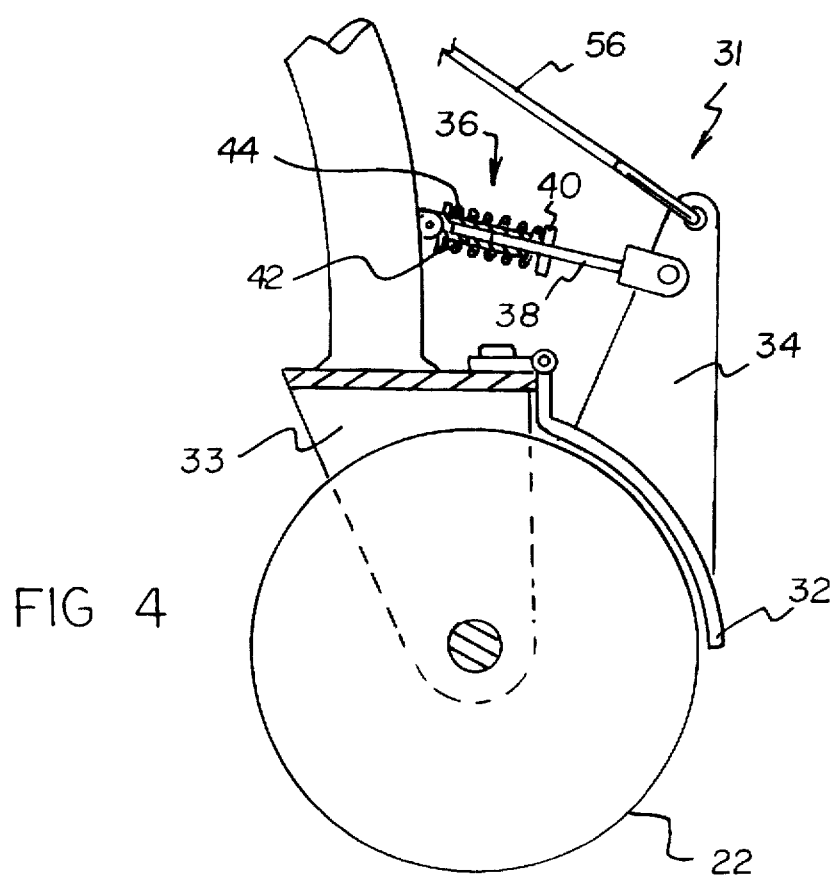
FIG. 4 is a side elevational view of the brake mechanism of the present invention.

As shown in FIGS. 2–4, a brake mechanism 30 is included with an arcuate shoe 32 hingably coupled at an upper end thereof to the lower storage portion of the cart. Such coupling is preferably afforded at a top portion of a fork 33 of the cart. A tab 34 is integrally coupled to an outer surface of the shoe and extended upwardly therefrom. Ideally, for optimal leverage that will become apparent later, the tab has a length of at least 1 and ½ inches. Associated therewith is an adjustable spring mechanism 36 having a first arm 38 rotatably coupled adjacent a top extent of the tab. The first arm has a flange 40 formed on a central extent thereof. Also included is a second hollow arm 42 rotatably coupled to the lower storage portion of the cart. The first arm is slidably situated within the second arm and a spring 44 is operatively situated about the arms between the lower storage portion of the cart and the flange. As such, the shoe has a first unbiased orientation abutting an associated rear wheel for precluding the movement of the cart and a second biased orientation with the shoe positioned away from the wheel for allowing the movement of the cart.

For controlling the brake mechanism, a brake disengagement assembly 48 is included with a hand lever 50. The handle lever has a pair of linear lever rods 52 rotatably coupled to the horizontal bar of the handle portion of the cart adjacent the vertical bars. At least one of such rods must be extended past the point of coupling for reasons that will be set forth hereinafter. A horizontally orientated cross bar 54 is integrally coupled between first ends of the lever rods. The brake disengagement assembly further includes a cable 56 coupled at a first end thereof to a second end of the lever rod which extends beyond the point of coupling. The cable is further coupled at a second end thereof to a top extent of the tab of the brake mechanism. It should be noted that the cable may be sheathed. Also, the cable may be situated within the cylindrical pipes which are used to construct the cart.

By this structure, the cross bar of the handle lever has a first orientation located at a distance above the horizontal bar of the handle portion of the cart when the shoe is in the first unbiased orientation thereof. Further, the brake shoe is forced to the biased orientation thereof upon a user positioning the handle lever in a second orientation thereof in abutment with the horizontal handle bar of the handle portion of the cart.

Finally, for protecting a user from the moving parts of the brake mechanism, a brake mechanism cover 60 is included. The cover has a generally rectangular configuration with a slot 62 formed on a top face thereof for allowing the passage of the cable therethrough. A lower slot 64 is also included for allowing rotation of the wheel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved hand operated shopping cart brake comprising, in combination:

a shopping cart having an upper storage portion with a bottom face, a rear face, a front face, a top opening and a pair of side faces defining an interior space; a lower storage portion situated below the bottom face of the upper storage portion with a plurality of stanchions coupled between a rear extent thereof and the bottom face of the upper storage portion, the lower storage portion further including a pair of front swiveling wheels depending from two front corners thereof and a pair of rear wheels depending from two rear corners thereof and rotatable about a fixed axis; a handle portion having a pair of generally vertical bars extending upwardly from opposite side faces of the upper portion adjacent the rear face thereof with a horizontal bar formed therebetween at the ends thereof, a horizontally oriented handle bar coupled to the ends of the horizontal bar via connecting members and further parallel therewith and positioned upwardly and rearwardly therefrom;

a brake mechanism including an arcuate shoe hingably coupled at an upper end thereof to the lower storage portion of the cart at a top portion of a fork of the cart, a tab having a length of at least 1 and ½ inches integrally coupled to an outer surface of the shoe and extending upwardly therefrom, an adjustable spring mechanism whose flexible portion lies in a direct line between the end of the first arm and the end of the second arm, said first arm rotatably coupled adjacent a top extent of the tab with a flange formed on a central extent thereof and a second hollow arm rotatably coupled to the lower storage portion of the cart wherein the first arm is slidably situated within the second arm and a spring is situated about the arms between the lower storage portion of the cart and the flange, whereby the shoe has a first unbiased orientation abutting an associated rear wheel for precluding the movement of the cart and a second biased orientation with the shoe positioned away from the wheel for allowing the movement of the cart;

a brake disengagement assembly including a hand lever having a pair of lever rods rotatably coupled at a midpoint thereof to the horizontal bar of the handle portion of the cart adjacent the vertical bars and a horizontally orientated cross bar integrally coupled between first ends of the lever rods, the brake disengagement assembly further including a sheathed cable coupled at a first end thereof to a second end of one of the lever rods and further coupled at a second end thereof to a top extent of the tab of the brake mechanism, whereby the cross bar of the handle lever has a first orientation located at a distance above the horizontal bar of the handle portion of the cart when the shoe is in the first unbiased orientation thereof and the brake shoe is forced to the biased orientation thereof upon a user positioning the handle lever in a second orientation thereof in abutment with the horizontal bar of the handle portion of the cart; and a brake mechanism cover with a generally rectangular configuration having a slot formed on a top face thereof for allowing the passage of the cable therethrough and a lower slot for allowing rotation of the wheel.

* * * * *